United States Patent
Weiss et al.

(10) Patent No.: US 12,423,794 B2
(45) Date of Patent: Sep. 23, 2025

(54) SYSTEM AND METHOD FOR ASSESSING QUALITY OF ELECTRONIC COMPONENTS

(71) Applicant: CYBORD LTD., Tel Aviv (IL)

(72) Inventors: Eyal Isachar Weiss, Bnei Reem (IL); Zeev Efrat, Ramat-Hasharon (IL)

(73) Assignee: CYBORD LTD, Tel Aviv (IL)

( * ) Notice: Subject to any disclaimer, the term of this patent is extended or adjusted under 35 U.S.C. 154(b) by 403 days.

(21) Appl. No.: 17/911,658

(22) PCT Filed: Apr. 8, 2021

(86) PCT No.: PCT/IL2021/050409
§ 371 (c)(1),
(2) Date: Sep. 15, 2022

(87) PCT Pub. No.: WO2021/205460
PCT Pub. Date: Oct. 14, 2021

(65) Prior Publication Data
US 2023/0129202 A1 Apr. 27, 2023

Related U.S. Application Data

(60) Provisional application No. 63/015,494, filed on Apr. 25, 2020, provisional application No. 63/008,276, filed on Apr. 10, 2020.

(51) Int. Cl.
*G06T 7/00* (2017.01)

(52) U.S. Cl.
CPC .. *G06T 7/0004* (2013.01); *G06T 2207/20081* (2013.01); *G06T 2207/20084* (2013.01);
(Continued)

(58) Field of Classification Search
CPC ......... G06T 7/0004; G06T 2207/20081; G06T 2207/20084; G06T 2207/30141;
(Continued)

(56) References Cited

U.S. PATENT DOCUMENTS 5,751,910 A 5/1998 Bryant et al.
6,023,663 A 2/2000 Kim
(Continued)

FOREIGN PATENT DOCUMENTS

CN 108665072 10/2018
EP 1212606 6/2022
(Continued)

OTHER PUBLICATIONS

International Search Report dated Aug. 17, 2023 International application PCT/IL2023/050458 filed May 4, 2023.
(Continued)

*Primary Examiner* — Bobbak Safaipour
(74) *Attorney, Agent, or Firm* — A.C. Entis-IP Ltd; Allan C. Entis

(57) ABSTRACT

A system and a method for assessing reliability of an electronic component. The method may include training a machine earning (ML) algorithm and/or a classification network to classify electronic components based on one or more features, attributes or characteristics related to reliability of the electronic components, e.g., related to a level of solderability of the components lead or balls or features indicating of tampering of the electronic component. By receiving an image of a test electronic component and extracting a feature related to reliability of the test electronic component from the image received, embodiments of the invention may enable classifying the test electronic component to a class indicating a reliability of the test electronic component by using the machine learning algorithm and/or the classification network.

12 Claims, 8 Drawing Sheets

(52) U.S. Cl.
CPC ............... *G06T 2207/30141* (2013.01); *G06T 2207/30152* (2013.01)

(58) Field of Classification Search
CPC . G06T 2207/30152; G06T 2207/10116; G06T 2207/20048; G06N 3/045; G06N 5/01; G06N 3/08; G01N 2021/8883; G01N 2021/8887; G01N 2021/95646; G06F 21/73

See application file for complete search history.

(56) References Cited

U.S. PATENT DOCUMENTS

| | | | |
|---|---|---|---|
| 9,410,898 | B2 | 8/2016 | Ikushima |
| 2004/0143352 | A1 | 7/2004 | Gyorfi et al. |
| 2006/0173654 | A1 | 8/2006 | Apps et al. |
| 2011/0102575 | A1 | 5/2011 | Case et al. |
| 2013/0284803 | A1 | 10/2013 | Wood |
| 2014/0281954 | A1* | 9/2014 | Ullrich .................. G06F 3/0483 715/702 |
| 2015/0078518 | A1 | 3/2015 | Tziazas et al. |
| 2015/0339862 | A1 | 11/2015 | Skaaksrud |
| 2016/0088264 | A1 | 3/2016 | Freeze |
| 2016/0282394 | A1 | 9/2016 | House et al. |
| 2017/0032285 | A1 | 2/2017 | Sharma et al. |
| 2017/0330201 | A1 | 11/2017 | Shaapur et al. |
| 2018/0031449 | A1 | 2/2018 | Cloake |
| 2018/0101945 | A1* | 4/2018 | Stone .................... G06V 20/95 |
| 2019/0213733 | A1 | 7/2019 | Yati |
| 2020/0068759 | A1 | 2/2020 | Cvijetinovic et al. |
| 2020/0082546 | A1 | 3/2020 | Cui et al. |
| 2020/0090003 | A1 | 3/2020 | Marques et al. |
| 2020/0294505 | A1 | 9/2020 | Shen et al. |
| 2020/0356741 | A1 | 11/2020 | Principato |
| 2020/0364817 | A1 | 11/2020 | Liu et al. |
| 2022/0164483 | A1* | 5/2022 | Weiss .................... G06F 21/44 |
| 2023/0129202 | A1* | 4/2023 | Weiss .................... G06T 7/0004 382/150 |

FOREIGN PATENT DOCUMENTS

| | | |
|---|---|---|
| KR | 101993705 | 6/2019 |
| WO | 2013116256 | 8/2013 |
| WO | 2015157526 | 10/2015 |
| WO | 2017201489 | 11/2017 |
| WO | 2020011447 | 1/2020 |
| WO | 2020048119 | 3/2020 |
| WO | 2021250679 | 12/2021 |

OTHER PUBLICATIONS

European Extended Search Report dated Apr. 11, 2024 for European application 21785725.9 filed Oct. 31, 2022.
International Written Opinion dated Jul. 15, 2021 for International application PCT/IL2021/050409 filed Apr. 8, 2021.
European Extended Search Report dated Jan. 26, 2024 for European application 21821205.8 filed Jan. 13, 2023.
International Search Report dated August Jul. 29, 2020 International application PCT/IL2020/050397 filed Apr. 1, 2020.
Office Action dated Jan. 19, 2024 for U.S. Appl. No. 17/599,603, filed Sep. 29, 2021.
Ning San Chang, SMV—A Computer Vision Program for Loading Surface Mount Components, Proceedings of SPIE vol. 0557, Dec. 19, 1985 (Dec. 19, 1985), pp. 1-6.
Daniel Singer. This AI Startup Keeps Counterfeit Components Out of Your Gadgets [retrieved Jan. 1927 on Nov. 13, 2019]. retrived from <https://www.startuphub.ai/this-ai-startup-keeps-counterfeit-components-out-of-your-gadgets> Daniel Singer, Nov. 19, 2019 (Nov. 13, 2019).
Supplamental Search Report dated Nov. 25, 2022 for Corresponding European application 20782042.4 filed Apr. 1, 2020.
International Search Report dated Aug. 25, 2021 for International application PCT2021050708 filed Jun. 10, 2021.
Written opinion of the ISA Dated Jul. 15, 2021 of PCT/IL2021/050409 Filed Apr. 8, 2021 (WO 2021/205460 Oct. 14, 2021).
Daniel Singer "This AI Startup Keeps Counterfeit Components Out of Your Gadgets", (retreived Nov. 27, 2022 from https://www.startuphub.ai/./interviews/), Nov. 13, 2019.
Search Report and Written Opinion dated Jun. 13, 2024 for PCT Application No. PCT/IL24/50206 filed Feb. 22, 2024.
Written Opinion dated Sep. 12, 2024 for PCT Application No. PCT/IL2023/050458 filed May 4, 2023.
Office Action dated Apr. 17, 2025 for U.S. Appl. No. 18/862,538, filed Nov. 3, 2024.
Office Action dated Mar. 4, 2025 for U.S. Appl. No. 18/009,999, filed Dec. 13, 2022.

* cited by examiner

SYSTEM AND METHOD FOR ASSESSING QUALITY OF ELECTRONIC COMPONENTS

RELATED APPLICATIONS

The present application is a US National Phase of PCT Application No. PCT/IL2021/050409, filed on Apr. 8, 2021, which claims the benefit under 35 U.S.C. 119 (e) of U.S. Provisional Application 63/008,276 filed on Apr. 10, 2020, and U.S. Provisional Application 63/015,494 filed on Apr. 25, 2020, the disclosures of which are incorporated herein by reference.

FIELD OF THE INVENTION

The present invention relates generally to assessing or evaluating the quality of electronic components and specifically to assessing solderability of electronic components and assessing tampering in electronic components within electronic and cyberspace hardware resources.

BACKGROUND

Assessing reliability of electronic components poses a major challenge to the entire electronic industry. Reliability assessment is required for ensuring successful soldering and normal functioning of components. Unreliable, defective, or counterfeit components may include recycled, post-dated, rejected, fake, blacktopped, hardware cyber, or any non-authentic component. Unreliable or defective components may have connecting leads, balls, or contact pads which may not be appropriately manufactured, may have deteriorated over time or whose poor handling lead to defective soldering between components. Inspection of components for identifying solderability of the components is crucial in cases when manufacturing date of the components is not known. Other interference with electronic components of hardware resources may be performed by a fraudulent party (such as an attacker) which may exploit vulnerabilities within electronic components hardware resources to threaten, steal, disrupt, or destroy information and services. Interference with a hardware resource may cause the hardware resource to operate maliciously, deviate from the intended manner of operation, hamper performance, or risk security of other hardware resources within the cyberspace. For example, such interference with the hardware resource may be caused due to any tampering with the components of the hardware resource by interfacing the electronic component with cyber elements or use of a counterfeit component within the hardware resource.

The potential loss associated with buying or selling unreliable, tampered with or counterfeit electronic products could reach millions of dollars caused by loss of reputation, reworks, lawsuits, failures, loss of functionality or cyber penetration. Conventional mitigation methods attempting to avoid counterfeit and/or unreliable electronic components may include controlling the supply chain using management tools that allow buying only from trusted and approved distributors or from the component's manufacturers directly. Other solutions for detection of counterfeit and/or unreliable electronic components utilizes manual inspection tools, like a magnifying glass, stereoscope or post assembly inspection tools like X-ray, CT, AOI, etc. Such inspection is slow, mostly manual and ineffective against sophisticated counterfeits. Furthermore, the inspection is done on samples of components, and this does not guarantee evading counterfeit components, as counterfeiters often mix authentic and fake components in the same reel packaging in order to avoid detection. Moreover, once a tampered component is built into the hardware resource, it is nearly impossible to identify the tampered component during testing of the hardware resource. Conventionally, manual inspection is performed to determine quality of solder joints formed after the assembly of the components. In this regard, a random number of such assembly of the components may be selected from a batch associated therewith. However, results from such inspection are highly inefficient and unreliable owing to human bias and human error. Further, such inspection is labor-intensive, expensive and is not feasible for each component in a large batch of components, thereby failing to eliminate security risks associated with any tampered component that may not be selected. Such manual inspection may also hamper the throughput of the assembly process of components owing to the time and cost-intensive nature thereof.

It is an object of the present application to provide an automated and efficient system and method for mass authentication and solderability testing of electronic components before or during assembly.

SUMMARY OF THE INVENTION

Embodiments of the invention allow assessing reliability of an electronic component, the method may include training a machine learning algorithm to classify electronic components based on a feature related to reliability of the electronic components, receiving an image of a test electronic component, extracting a feature related to reliability of the test electronic component from the image and classifying the test electronic component to a class indicating a reliability of the test electronic component by using the machine learning algorithm.

According to some embodiments of the invention, the reliability of the electronic components may be determined based on a solderability level of the electronic component leads.

According to some embodiments of the invention, the feature related to reliability of the electronic components may be a physical feature representing deterioration of electronic component leads in time.

According to some embodiments of the invention, the physical feature representing deterioration of electronic component leads in time may be a texture of a surface of the electronic component leads.

According to some embodiments of the invention, training the machine learning algorithm may be performed by a plurality of verified electronic components of different production dates.

According to some embodiments of the invention, the class may indicate an age of the test electronic component.

According to some embodiments of the invention, classifying the test electronic component further may include unsupervised group separation to determine if the test electronic component belongs to one of: a group of electronic components having a first solderability level or a group of electronic components having a second solderability level.

According to some embodiments of the invention, the reliability of the electronic components may be determined based on a detection of tampering in the electronic component.

According to some embodiments of the invention, the feature related to reliability of the electronic components may be a physical feature representing programming via contact of the electronic component.

According to some embodiments of the invention, the physical feature representing programming of electronic component may be a mark on a surface of a contact of the test electronic component.

According to some embodiments of the invention, the mark may be created by a force applied on a surface of a contact of the test electronic component.

According to some embodiments of the invention, training the machine learning algorithm may include performing augmentation techniques on the mark created by a force applied on a surface of the contact electronic component.

According to some embodiments of the invention, classifying the test electronic component may include classifying according to a first classifier and a second classifier.

According to some embodiments of the invention, the first classifier may be a binary classifier to determine if a lead of the test electronic component is pristine or tampered and the second classifier may be to determine a tampering type.

Embodiments of the invention may include a system for assessing reliability of an electronic component, the system may include a memory, an imaging device and a processor configured to: train a machine learning algorithm to classify electronic components based on a feature related to reliability of the electronic components, receive an image of a test electronic component from the imaging device, extract a feature related to reliability of the test electronic component from the image and classify the test electronic component to a class indicating a reliability of the test electronic component by using the machine learning algorithm.

According to some embodiments of the invention, the processor further configured to train the machine learning algorithm by a plurality of verified electronic components of different production dates.

According to some embodiments of the invention, the processor further configured to train the machine learning algorithm by performing augmentation techniques on the mark created by a force applied on a surface of the contact electronic component.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
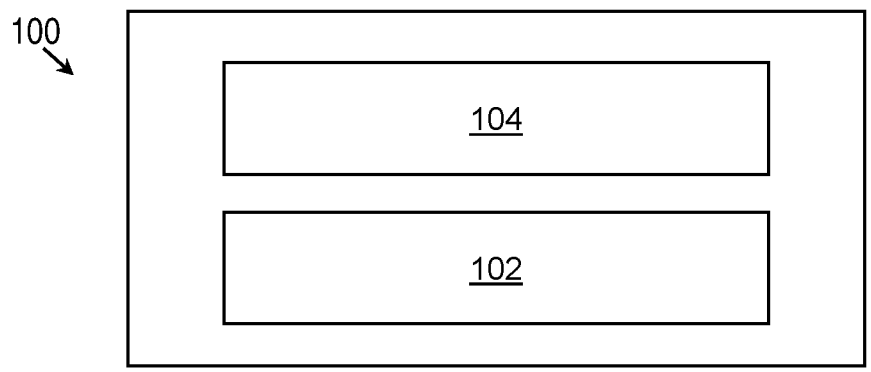
FIG. 1 is a schematic illustration of a system for automated reliability assessment of an electronic component in accordance with some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

The term "component" may be used herein to refer to any electronic component or device that may be a part of electronic circuitry, or the electronic circuitry itself. For example, the component may be an electronic component affixed on another electronic component to implement the electronic circuitry. Examples of the component may include, but are not limited to, a resistor, a capacitor, an inductor, a transistor, an integrated Circuit (IC), a microcontroller, a diode, a Light Emitting Diode (LED), an electronic socket, a circuit board and printed circuit board (PCB)

A plurality of electronic components may be assembled to form a hardware resource that may be implemented within a cyberspace. For example, a number of such hardware resources within a cyberspace may be in communication with each other using communication networks. It is to be noted that a hardware resource may include a multitude of components. In an example, the components may be arranged in a defined configuration, also known as electronic circuitry, owing to soldering operations performed thereon, to implement the hardware resource. An electronic circuitry makes use of a variety of components. Typically, one or more devices may be affixed on a board, for example, Circuit Board (CB) and Printed Circuit Board (PCB) to form the electronic circuitry. One or more devices may be affixed on the board by employing techniques, for example, soldering. Each component, such as a passive electronic component or an active electronic component may be provided with connecting leads or balls, or any other method to allow connecting to the CB or PCB. Soldering operations are performed on the connecting leads for affixing the component. A PCB may also include a plurality of contact pads which are used for soldering operations.

Embodiments of the invention may include a system and a method for assessing reliability of an electronic component. The method may include training a machine learning (ML) algorithm and/or a classification network to classify electronic components based on one or more features, attributes or characteristics related to reliability of the electronic components, e.g., related to a level of solderability of the components lead or balls or features indicating of tampering of the electronic component. By receiving an image of a test electronic component and extracting a feature related to reliability of the test electronic component from the image received, some embodiments of the invention may enable classifying the test electronic component to a class indicating a reliability of the test electronic component by using the machine learning algorithm and/or the classification network.

Embodiments of the invention may enable automated assessment of the solderability of electronic components. The system and method described herein may be employed to automatically inspect any tampering, altering, damaging, or misusing or degradation of an electronic component. In some embodiments of the invention, degradation may be checked at a surface of a component or surface of soldering leads attached to or embedded in a tested electronic component. A reliability assessment may be performed for a large number of components without human bias in a time-effective and cost-effective, without compromising on results of the assessment of components. Moreover, some embodiments of the invention may assess reliability of electronic components efficiently within a limited time period without an extensive increase in computational resources, such as computing power or memory. For example, some embodiments of the invention may be implemented in the assembly process of a Surface-mount technology (SMT) pick and place machine, wherein a reliability assessment of authenticity and solderability of the component may be performed in a time period within a pick and place time in the assembly process.

The term "solderability" may be used herein to refer to solderability or solderability level of a component as a measure of ability by virtue of which the component may effectively form a solder joint. The solderability or solderability level of a component may be associated with the surface quality and the soldering leads metallic composition. Solderability of the component may refer herein to an ability of a material used for soldering, fusing, joining or connecting of an electronic component. A solderability level above a predetermined or predefined level may ensure proper soldering, fusing, joining or connecting of an electronic component. For example, solder wire, solder paste, solder pads, solder leads, solder balls or solder contact on a surface of a component to form a solder joint between the electrical component, e.g., a resistor and a PCB or other element. In an example, the surface of the component may be a surface of a connecting lead associated with the component, surface of the body of the component, or surface of an existing solder joint or soldering balls associated with the component.

Solderability of a component may be affected by any one of nature of material of the component, degree of cleanliness of the surface of the component, and aging of the component, the composition, and morphology of the surface. Therefore, assessment of a component is crucial to identify its solderability prior to, for example, fabrication of the component in electronic circuitry or use of a component having soldered joints. Moreover, deterioration to the solderability of a component may occur due to the formation of a contamination layer on the surface of the component due to any of the above-stated conditions.

Wetting of a component may occur when solder material comes in immediate contact with the component, specifically, the surface of the component. Therefore, any contamination film such as an intermetallic layer, oxide layer, oil layer, and the like, on the surface of the component may act as a barrier between the solder material and the component, thereby preventing wetting of the surface and affecting a solder joint thus made. Conventionally, solderability of the component or the surface of the component is tested visually, for example, using the edge-dip method. In this regard, the component is partly dipped vertically and edgewise into, for example, molten solder and then withdrawn. Thereafter, the coating of molten solder is examined to assess solderability of the component. Poor solderability of a component hampers wetting of the component and thus solder joint(s) formed for affixing the component. For example, poor solderability of the component may cause non-adherence of solder material on the surface of the component. In another example, poor solderability of the component may cause receding of solder material from the surface of an existing solder joint associated with the component, thereby leaving irregularly shaped mounds.

It may be assumed that the solderability of leads inside a package, e.g., a reel or tray of components is practically the same. However, uniformity of the leads apparent age varies significantly within the package. As a result, sampling only one or a small number of components within a package may not represent the entire components of that package and may lead to a very large error in prediction of the package or reel solderability. The apparent age distribution inside the packaging unit (reel) may vary between different manufacturers and different ways of storage and handling. In addition, the older the component reels, the wider the apparent age variation within the reel. This may lead to larger error in prediction of the solderability of the reel.

FIG. 1 is a schematic illustration of a system for automated reliability assessment of an electronic component in accordance with some embodiments of the invention. System 100 may include an imaging system 102 and a processor 104. Imaging system 102 may be used for capturing, detecting, inspecting, probing, testing and/or sensing an electronic component. In some embodiments of the invention, imaging system 102 may be used for capturing a representation of an electronic component either from the top and/or from the bottom or from any other direction. A representation of the electronic component may be a pictorial depiction of the component, e.g., an image, a photograph, a three-dimensional image or any other pictorial representation of the component. In some embodiments of the invention, imaging system 102 may be connected, linked, attached, related to and/or include one or more measurement probes which may be positioned above or below a detected electronic component.

Processor 104 may be an assembly of one or more computational elements arranged in a serial or parallel configuration to perform operations associated with the system 100. Processor 104 may be connected to or coupled to imaging system 102. In some implementations of the present subject matter, processor 104 may include, or may be coupled to other computational entities, for example, a memory, a network interface, a database, a server and the like. In some embodiments of the invention, processor 104 may be implemented internally in system 100 while in other embodiments processor 104 may be implemented externally, e.g., on a cloud or in a remote facility or server. It is to be noted that, in certain implementations, processor 104 may be coupled to a plurality of imaging systems 102 at a given time. In this regard, processor 104 may assess reliability of a plurality of components, simultaneously. However, for the sake of brevity, the present subject matter is explained in conjunction with a single component and a single imaging system. Any of the components included in system 100 may be the example computer system shown in FIG. 9, and any of the operations described with relation to system 100 may be performed, for example, by the example computer system shown in FIG. 9.

According to some embodiments of the invention, processor 104 may receive a representation of an electronic component from imaging system 102 and may process the representation of the component to determine a set of attributes, features, parameters or other characteristics associated with the component. For example, a representation of the component may correspond to the surface of a body of the component and one or more connecting leads or balls associated with the component. For example, the set of attributes associated with the component may correspond to at least one of: manufacturing information and/or physical features of the component. The manufacturing information may include, for example, type, manufacturer, manufacturing technique, manufacturing machinery, and the like. A physical feature may include, for example, dimensions, markings, texture, color, shape, solder-leads or balls conditions, and condition.

According to some embodiments of the invention, processor 104 may identify the predefined attributes for the component. The predefined attributes may refer to characteristic attributes for the component based on, for example, type and manufacturing information thereof. For example, the type of component may be a "multi-layered ceramic capacitor" and the manufacturing information may correspond to a manufacturer's information, e.g., 'ABC electronics'. Moreover, the predefined attributes may correspond to authentic physical features for the component, wherein the authentic physical features may be derived from an authentic component. For example, the predefined attributes may be provided by a user of the system previously or a manufacturer of the component.

In some embodiments of the invention, processor 104 may compare a set of attributes of an electronic component with predefined attributes. In an example, the processor compares the set of attributes with the predefined attributes to identify any change in any attribute of the component. Subsequently, the processor 104 may assess tampering in the component and/or assess solderability of the component based on such change in any of the sets of attributes of the component. For example, the processor 104 may further assess the extent of change with respect to a threshold. In an example, the system may compare dimensions of the component with predefined dimensions. Upon identifying a change in the dimension to be, for example, less than a predefined threshold of, e.g., 0.1-1 millimeters (mm), the system may consider the change to be insubstantial and thus regard the component as non-tampered. Upon identifying a change in the dimension to be, for example, higher than a predefined threshold of, e.g., 0.1-1 millimeters (mm), the system may consider the change to be insubstantial and thus regard the component as tampered. As would be understood, a non-tampered component may have close adherence to the predefined attributes. In such a case, the component may be assessed to be non-tampered and fit for assembly to form the hardware resource. To such end, if the extent of change in one or more attributes of the component is higher than the corresponding threshold, then the system may regard the component as tampered.

According to some embodiments of the invention, processor 104 may employ an artificial intelligence (AI) module which may implement, use or apply one or more machine learning algorithms and/or one or more classification networks to assess the set of attributes of a detected or test component to deviate with respect to predefined attributes. For example, processor 104 may employ an artificial intelligence module to perform operations of assessing tampering in the component and assessing solderability of the component leads, e.g., the artificial intelligence module may be used for derivation and analysis of the parameters of the component or the contamination layer. The artificial intelligence module may be implemented using machine learning algorithms for such operations. The machine learning algorithm or engine may be trained using a plurality of images associated with electrical components.

The AI engine included in processor 104 may employ one or more machine learning algorithms that may use training dataset to acquire knowledge and further apply the acquired knowledge for new environments, or components, also referred to herein as "test components". In case of no historical data or training set regarding a component to be assessed, the AI engine may devise a new algorithm for assessing solderability of the component. The machine learning engine or algorithm may employ deep learning algorithms for performing operations based on patterns from past data without being explicitly performed. Thus, machine learning algorithms employed by processor 104 may enable assessment of solderability of components and tampering of components in an automated manner without human involvement. The processor or the machine learning algorithm of the processor may be an electronic circuitry or a software-implemented program. The machine algorithm may be trained to classify electronic components based on a feature related to reliability of the electronic components.

Embodiments of the invention are not limited to assessing solderability of a component. For example, any kind of tampering in a component performed after the manufacturing of the component may cause a change in the set of attributes of the component which may be identified by a one or more machine learning algorithms and/or classification network. The system disclosed herein is capable of assessing solder joints of an assembly of components, wherein the components may be assembled to form an electronic circuitry. To such an end, the solder joints may be formed by way of through-hole or surface mount modus operandi.

According to some embodiments of the invention, system 100 may be used for automated assessment of the solderability of an electronic component. In some embodiments of the invention, imaging system 102 may enable processor 104 to construct an image of the component in order to assess solderability of the component. Imaging system 102 may include, for example, a radiation source, e.g., for generating electromagnetic radiation. The generated electromagnetic radiation may be projected onto a surface of a component that is to be assessed. Imaging system 102 may further include a receiver for receiving electromagnetic radiation reflected from the surface of the component.

For example, electromagnetic radiation generated by the source of imaging system 102 may be projected on the surface of an electronic component, wherein a contamination layer may have grown on the surface. For example, the contamination layer may have different attributes as compared to the surface of the components. The attributes may be, for example, reflectivity, texture, and color. The electromagnetic radiation reflected from the surface of the component may be affected due to attributes of the contamination layer present on the surface of the component. In an example, the generated electromagnetic radiation may be at least one of Ultraviolet (UV) radiation, visible radiation, and Infra-red radiation (IR). In this regard, the generated electromagnetic radiation may have a wavelength in a range of 10 nanometers (nm) to 750 nm. For example, source 102 may be a UV lamp, and the receiver 104 may be a UV sensor. It should be understood to a person skilled in the art that a contamination layer may refer to any external material on surface of an electrical component. However, a contamination layer may be built additionally or alternatively by any internal chemical transformation of the metals inside the leads, e.g., by interaction with oxygen in the environment causing corrosion.

In some embodiments of the invention, the electromagnetic radiation generated by a source included in imaging system 102, and the electromagnetic radiation received by a receiver included in imaging system 102 may be provided to processor 104 for analysis. Processor 104 may process the generated electromagnetic radiation, and the received electromagnetic radiation reflected from the surface of the component to derive parameters of the component. Processor 104 may further analyze the derived parameters by one or more machine learning algorithms and/or one or more classification networks to assess the solderability of the component. For example, processor 104 may analyze spectra of the received electromagnetic radiation to derive parameters of the component. The received electromagnetic radiation may be reflected from the surface of the component, or from the contamination layer present on the surface of the component. Therefore, the derived parameters may reflect a condition of the component, e.g., a surface of the tested component or a contamination layer present on the surface of the tested component. In an example, in case of the presence of the contamination layer on the surface of the component, such contamination layer may be analyzed based on parameters associated with the component to determine the solderability of the component. The derived parameters with a component may indicate a state of the component or a state of the surface of the body or soldering leads of the component.

In some embodiments of the invention, the source and the receiver may be replaced or enhanced by an imaging device, e.g., a camera, wherein the imaging device may be coupled to processor 104. Further, the implementation of the source and the receiver as an imaging system should not be construed as limiting in any way. In an alternate implementation, imaging system 102 may be any device, system, unit or arrangement that may enable processor 104 to derive parameters of an electronic component without deviating from the scope of the invention. Moreover, on assessing any tampering in the component or any solderability issue may cause the processor 104 to generate an alert signal for deeper investigation of the tampering, to ensure the integrity of hardware resources.

Figure 2:
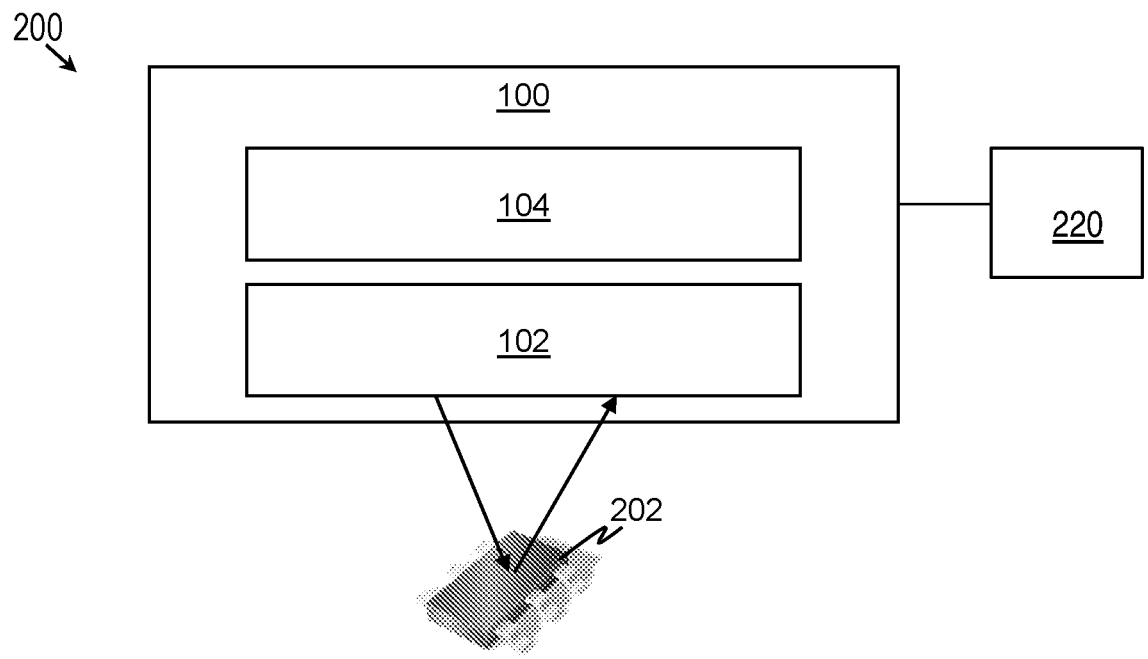
FIG. 2 is a schematic illustration of an environment where a system for automated assessment of tampering and solderability of electronic components is implemented, according to some embodiments of the invention.

FIG. 2 is a schematic illustration of an environment where a system for automated assessment of tampering and solderability of electronic components is implemented, according to some embodiments of the invention. Environment 200 may include system 100 of FIG. 1 for reliability assessment of electronic components. System 100 may include an imaging system 102 and a processor 104 for assessing the solderability and/or tampering of a component 202. Component 202 may be any electronic component, for example, a resistor, a capacitor, a transistor, an Integrated Circuit (IC), an inductor, an electronic chip, PCB, or any other electronic component or electronic circuitry. In some embodiments of the invention, solderability and tampering assessment of a plurality of electronic components 202 may be assessed simultaneously. However, for the sake of brevity, the present example is explained in conjunction with a single component 202.

System 100 may further include or may be coupled to a computing platform 220. Computing platform 220 may include one or more services coupled to system 100 and/or processor 104 by one or more communication network. Such a communication network may be implemented by way of wired communication means, wireless communication means, or a combination thereof. Computing platform 220 may include, for example, a remote processor and/or, graphics processing unit (GPU) and/or, a gateway server and/or a database. Any other device, service or platform may be included in computing platform 220. Any of the components included computing platform 220 and system 100 may be the example computer system shown in FIG. 9, and any of the operations described with relation to computing platform 220 and system 100 may be performed, for example, by the example computer system shown in FIG. 9.

According to some embodiments of the invention, imaging system 102 may be used for capturing a representation of component 202 either from top or from bottom or both. Imaging system 102 may capture a representation of component 202 that is to be assessed. For example, imaging system 102 may include a digital still camera, a camcorder, a video camera, a 3d-camera. a profiling camera, and the like. A captured representation of component 202 may be a three-dimensional or a two-dimensional image, picture, drawing, projection, and the like. In some embodiments of the invention, imaging system 102 may be an on-premise camera that is already a part of an SMT pick and place system. Further, imaging device 102 may provide the representation of the component to the processor 104, for processing thereof. Processor 104 may analyze a representation of component 202 to determine a set of attributes, identify predefined attributes for component 202, compare the determined set of attributes with the predefined attributes and assess tampering in the component 202 and/or solderability of component 202, as described in some embodiments of the invention.

According to some embodiments of the invention, processor 104 may employ a machine learning engine for processing the output of imaging system 102, e.g., a representation of component 202 and/or electromagnetic radiation. Processor 104 may derive parameters and/or attributes of component 202 and may analyze the derived parameters to assess solderability and tampering related to component 202 by using an artificial intelligence module or engine. The artificial intelligence module of processor 104 may be an electronic circuitry, a software-implemented program, or a combination thereof. The artificial intelligence module of the processor may process the representation of component 202 to determine the set of attributes, identify the predefined attributes, derive parameters of component 202, compare the determined set of attributes and/or parameters with predefined attributes and/or parameters and assess tampering and/or solderability of the component 202. The artificial intelligence module may include, employ, implement, use or utilize one or more machine learning algorithms which may be trained using a plurality of images associated with the component captured by imaging system 102. The machine learning engine may be trained based on multiple images of components stored in database, e.g., database 220. The plurality of images which are used for training the machine learning algorithms may be tagged by characteristics, parameters, attributes and any other related information, e.g., their manufacturers. package types, production dates. Any other information may be used for tagging images of components during the training process of the machine learning algorithm.

In some embodiments of the invention, the artificial intelligence module, upon determining the set of attributes of component 202, may identify the component based on, for example, unique marking, size, engraving, indentations, etc. The artificial intelligence module may determine a processing algorithm, e.g., a machine learning algorithm for component 202. In some embodiments, the predefined attributes for component 202 may be constituted within a processing algorithm of the artificial intelligence module. In some embodiments, the processing algorithm may be based on at least one of machine learning or big data. For example, the processing algorithm may employ deep learning algorithms, neural networks or deep neural networks, e.g., convolutional neural network (CNN), shift invariant artificial neural networks (SIANN), generative adversarial network (GAN), and the like.

According to some embodiments of the invention, the machine learning engine or algorithm also referred to herein as "processing algorithm", may assess tampering in component 202 and/or solderability and/or age of component 202 without being explicitly performed for the same. For example, the processing algorithm may be previously trained using training datasets, wherein the training datasets may be labeled, unlabeled or a combination thereof. The processing algorithm may be trained using the training datasets in a supervised, unsupervised, or reinforced manner. For example, the artificial intelligence module may identify the predefined attributes for component 202 based on the training dataset. The training dataset may include a large number of images of components tagged by one or more known or proved features, attributes, characteristics, or any related information. Moreover, in some cases, the artificial intelligence module may generate the processing algorithm for component 202 based on the set of attributes of component 202 and training datasets. For example, the machine learning engine or algorithm may identify a pattern, for example, parameters relating to a type of contamination layer, based on experience of previous learned components. The machine learning engine may gain experience from training datasets and further implementation of the system on assessment of components.

For example, the artificial intelligence module or the processing algorithm may be trained using a plurality of images of components, wherein the plurality of images may indicate at least one of manufacturing information associated with the component, tampered condition and non-tampered condition for the component, solder-leads or balls conditions of the component, age of a component, manufacturer of a component or any other attribute or parameter related to component 202. For example, the plurality of images of component 202 may be labeled based on manufacturing information, such as manufacturer, component package type, model, connecting leads or balls, manufacturing date, manufacturing place, type, manufacturing process, manufacturing equipment or machinery, and the like. In another example, the plurality of images of the component 202 may be labeled based on tampered condition and non-tampered condition for the component, wherein such conditions may be indicated using images of tampered and non-tampered component 202, respectively, from industries, or from artificial environments where the component may be tampered using different processes, such as markings, use of chemicals, burning of cyber elements, coating of connecting or interfacing leads or balls, and the like. In yet another example, the plurality of images of component 202 may be labeled based on the conditions, shape, characteristics or attributes of contact of component 202, e.g., solder-leads or balls conditions for component 202. A variety of contacts conditions may be included in a plurality of images depicting variations in contacts shape, structure, appearance, or any other characteristic.

The artificial intelligence module according to some embodiments of the invention may store a plurality of processing algorithms or ML algorithms, wherein the plurality of processing algorithms or ML algorithms may correspond to different components. The processing algorithm may be used to assess the set of attributes of component 202, such as by comparing the set of attributes with the predefined attributes comprised therein. Processor 104 may compare the determined set of attributes with the predefined attributes by using one or more models of the machine learning algorithm. Based on the comparison of the set of attributes with the predefined attributes, processor 104 may determine a change in any of the set of attributes of the component 202. For example, the processor 104 may further determine the extent of the change based on the corresponding threshold. Further, in cases when the extent of change is greater than the threshold, the processor may regard the component 202 as tampered.

According to some embodiments of the invention, one or more machine learning algorithms may be trained to classify electronic components based on one or more features related to reliability of the electronic components. The machine learning algorithms may be applied to a test component by receiving an image of the test electronic component, extracting a feature related to reliability of the test electronic component from the image and classifying the test electronic component to a class indicating a reliability of the test electronic component. In some embodiments of the invention, the reliability of the electronic components may be determined based on a solderability level of the electronic component leads, and the feature related to reliability of the electronic components is a physical feature representing deterioration of electronic component leads in time, for example, a texture of a surface of the electronic component. In some embodiments of the invention, the reliability of the electronic components is determined based on a detection of tampering in the electronic component. The feature related to reliability of the electronic components may be a physical feature representing programming of the electronic component, e.g., an evidence or a mark on a surface or a contact of the test electronic component that may be created by a force applied on the surface of the test electronic component contacts, leads or balls.

Embodiments of the invention may assess reliability of one or more components 202 that may be tampered by burning of cyber elements or software thereon. In some embodiments, for the burning of cyber elements, a firm contact is made with, for example, balls of component 202, thereby leaving evidence, signs or marks on the balls of component 202. In some embodiments, for the burning of cyber elements, connecting leads of component 202 may be interfaced by depressing probes (such as, bracket, jig, and the like) onto the connecting leads thereby leaving evidence, signs or marks on the connecting leads. According to some embodiments of the invention, images of such marks due to tampering may constitute the training datasets, corresponding to the tampered condition of component 202. For example, the processing algorithm may compare predefined attributes corresponding to the tampered condition of component 202, in the training dataset, to search for such marks of tampering in component 202 that may be caused due to re-programming of component 202. The ML algorithm may regard component 202 as tampered owing to close adherence (or less change) compared to the predefined attributes.

In some embodiments of the invention, component 202 may be a counterfeited component, wherein component 202 may be engineered to pose as similar to an authentic component. The counterfeited component 202 may be designed to look and feel like an authentic component to allow infiltration into the production line and the product. However, the component may only look like an authentic component where in fact it is a component engineered to perform a cyber-attack on systems. However, in such a case, the counterfeited component 202 may be manufactured using a different manufacturing technique, machinery, or process. Subsequently, images relating to manufacturing characteristics of the authentic component may constitute the training datasets, corresponding to the manufacturing information of component 202. For example, the processing algorithm may compare such manufacturing characteristics of the non-tampered (or authentic) component in the training dataset with the set of attributes of component 202.

According to some embodiments of the invention, component 202 may be a programmable component subjected to a firmware, wherein, for such manipulation of the component 202, an attacker may have to unmount the component 202 from its original position in a circuit to interface it and further re-mount it at the original position. Such re-programming and/or re-mounting of the component may leave traces, evidence, marks or indications on the body and/or connecting leads or balls of the component 202. Subsequently, images of the condition of the leads of a non-tampered component may constitute the training datasets, wherein such non-tampered components may have no traces or marks. For example, the processing algorithm may compare predefined attributes corresponding to the solder-leads or balls conditions of the non-tampered component, in the training dataset, to the set of attributes of component 202 having such traces, evidence or marks. The processing algorithm may regard component 202 as tampered owing to the change compared to the predefined attributes.

According to some embodiments of the invention, the plurality of images of component 202 should not be as construed limiting for the training datasets. The training datasets may comprise a plurality of images of components other than component 202, wherein such plurality of images may be used during assessment of tampering in the plurality of components and/or during assessment of the solderability of components other than component 202. In some embodiments of the invention, the training datasets may also include a threshold for change for the assessment of tampering in the component. The processing algorithms may be trained based on real tampered components and augmentations of non-tampered components. According to some embodiments of the invention, processor 104 or the artificial intelligence module of processor 104 may further generate an alert signal on assessing the component 202 to have been tampered with.

Figure 3A:
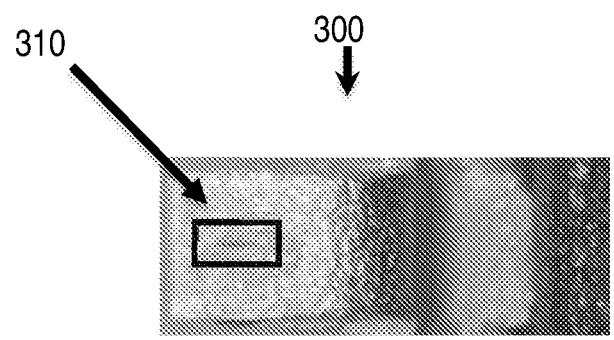
FIGS. 3A and 3B are pictorial illustrations of traces on soldering leads and balls of an electrical component, according to some embodiments of the invention.
Figure 3B:
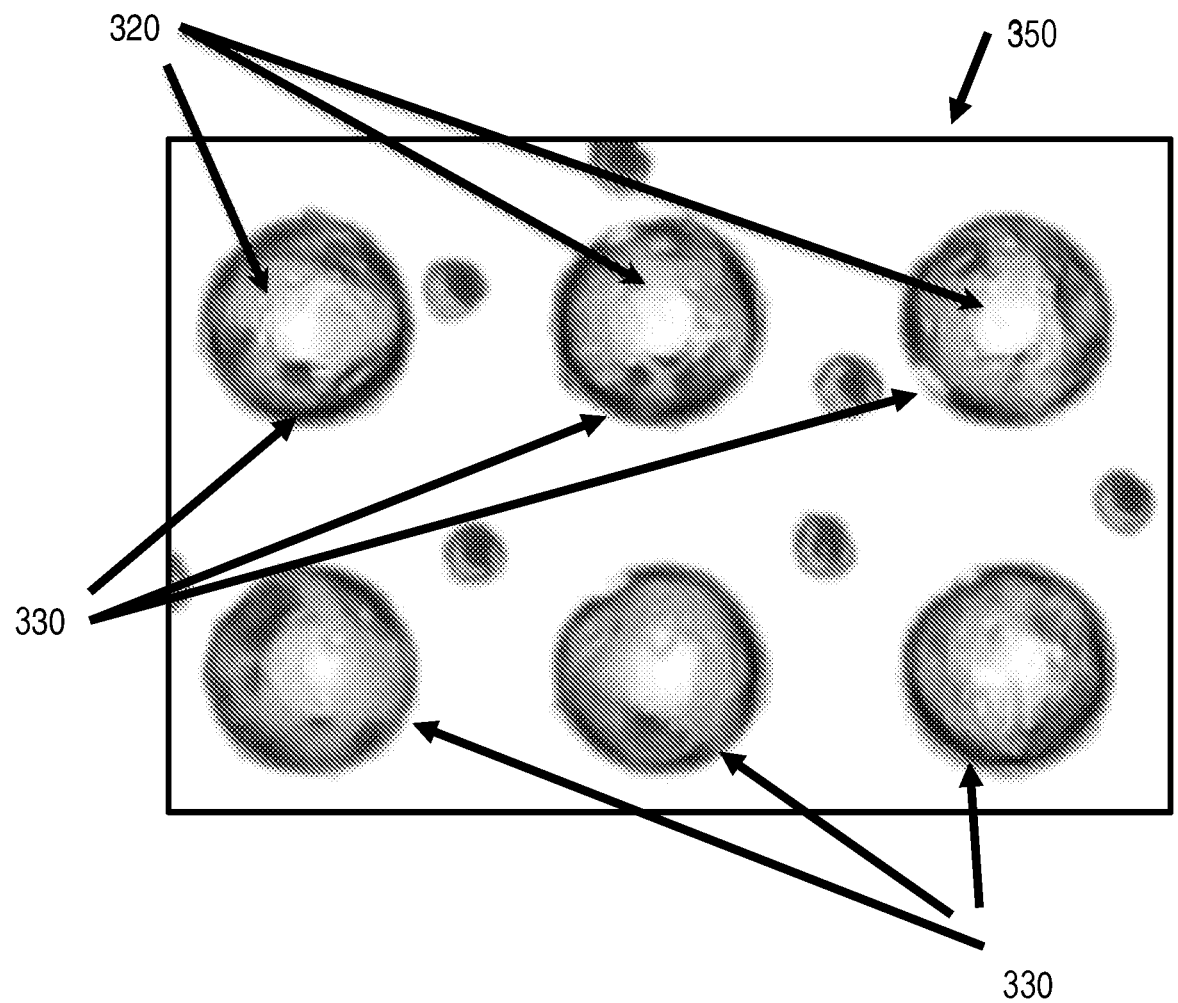

Reference is now made to FIGS. 3A and 3B which are pictorial illustrations of traces on soldering leads and balls of an electrical component according to embodiments of the invention. Embodiments of the invention may train ML algorithms or models to detect traces left by a programming bracket of an attacker on the leads or balls. ML algorithms may require a large amount of data to build a model. According to some embodiments of the invention, the ML model may learn the principles of how the programming is done on a component and then may simulate the traces it leaves on other pristine leads or balls using a generative adversarial network (GAN) or similar methods. FIG. 3A shows an exemplary mark 310 on a lead 300 of an electronic component. The marks 310 created by programming of the electrical component may have a specific, explicit unique characteristics, e.g., marking of linear groove may be left on the leads. The unique groove, trench, slit, depression, or channel may be created by the force applied on the leads by a programming probe to make sure good contact is established between the lead and the programming probe. In leads which are made of soft metal compound, such a force may leave a linear pattern mark imprint on the lead.

Embodiments of the invention may include training a machine learning algorithm to classify electronic components based on a feature related to reliability of the electronic components assessing. The reliability of the electronic components may be determined based on a detection of tampering in the electronic component, and the feature related to reliability of the electronic components may be a physical feature representing programming of the electronic component such as the mark left on a surface of leads of a test electronic component. The mark may be created by a force applied on a surface of the test electronic component leads.

In order to get enough examples of "tampered" components for training the machine learning algorithm, a pattern of a mark may be simulated on pristine leads. To allow a simulation or training process to have a realistic learning effect, some embodiments of the invention may perform augmentation techniques on the mark created by a force applied on a surface of the electronic component leads, for example, by using a generative adversarial network (GAN) or similar methods. An image of a mark on lead of a component may be augmented for training of the machine learning algorithm. The augmentation may be performed by making small incremental variations to an image of a typical mark on the leads, e.g., the variations may include change, adjustment, shift or alteration in the groove pattern by, for example, varying its width, depth, length, continuity, angle or any other characteristic or parameter.

FIG. 3B shows exemplary balls of an electronic component. The marks or traces 320 created by programming on balls 330 of an electrical component 350 may have a specific, explicit unique characteristics. Balls may be interfaced by applying force on the entire component from the top down and not only by probing, as performed when programming leads of a component for example. When programming via balls, a force may be concentrated on the soldering balls, thus truncating the tops of the balls in contact as shown by FIG. 3B or on the base of the balls using, for example a crown probe. The truncated marks on the top of the ball may reflect the light very differently than a pristine ball and may be detected to detect programming. To allow a simulation or training process to have a realistic learning effect and to create an effective machine learning model, a large number of samples or cases are required. Therefore, some embodiments of the invention may perform augmentation techniques on the marks created by a force applied on balls of electronic components. For example, the augmentation may be performed by making small incremental variations in the shape of the truncated ball top.

The detection algorithm, also referred to herein as "a first classification layer", may be first performed on each individual lead or ball in the image of the detected component, also referred herein as "a test component". The leads or balls of the test component may be named by their coordinates on the components as an array, e.g., each lead or ball may be named related to its position in the array or set of leads or balls. According to some embodiments of the invention, the image of each of the leads or balls may be cropped for analysis as an individual lead or ball from the image of the entire set of leads or balls of the component. The image of a single lead or ball may be then classified into a group from a plurality of groups using a convolutional neural network implemented by the ML algorithm.

According to some embodiments of the invention, the ML algorithm implementing the convolutional neural network may classify the image to groups based on a pre-trained model. The classification groups are separated into types of models or classifiers, e.g., a first model type or a first classifier and a second model type or a second classifier. The first classifier may be a binary classifier to determine if a lead of the test electronic component is pristine or tampered. The lead or ball of a test component may be checked to determine if the lead or ball is pristine or tampered with. This is a binary output, as the output is one of two options "pristine" or "not pristine". The second classifier may classify a type of tampering, e.g., the specific way or method in which the component was tampered with. For example, tempered lead or ball may be classified based on the type of tampering that represent different probe shapes and sizes. As different types of programming contraptions are available for programming, each type of programming may leave different or unique traces, marks or tracks on the leads or balls. The output of the first classifier and second classifier may be combined, processed or evaluated to a fitness classification value for each lead and ball of the component. The fitness classification value may include a score, a value a mark or a grade which may indicate the resemblance, likeness, similarity, analogy between the tested lead or ball to the model. The obtained set of values or scores, e.g., a value for each lead or balls of the component, may be then placed back in inference scores array that represent the set or group of leads of the component to be used by a component level algorithm also referred to herein as "a second classification layer".

In some embodiments of the invention, burning of software on components may not always utilize all the leads in the component, for example, only a set of selected leads from the leads or balls of an electronic component may be used for programming the component. In some embodiments of the invention, further to a first layer of classification based on which tampering in a single lead or ball may be detected, the ML detection algorithm may process an additional, second classification layer by characterizing the pattern of the leads or ball with evidence of interface with a programming probe in order to evaluate if the interfaced, marked or damaged leads were used for programming or if they include random damage to a specific lead or ball, e.g., not made by programming. The input to the second classification layer may be the results or the output of the first classification layer, and the output of the second classification layer may be a detection pattern for each tested component in the package. Additionally, the second layer may compare the pattern between the components in the packaging unit to verify that the detected traces are not random but represent a programming act. The second classification layer may be used for at least two functions: a) to ensure that within a component the detected marks are not random noise on some of the leads or balls and to ensure that the component was interfaced by a programming jig, and b) to perform a cross check of the programming pattern of multiple components in a packaging unit, in order to check if programming is not only random noise in one component compared to finding one or more similar patterns on other components in the packaging unit.

The inference scores array obtained in the former section may now be used for estimating the probability that a component was interfaced by a programming jig or not. The array may be used for application of a set of rules, policies or procedures related to consistency and logic based on which the classification may be determined. For example, classifying an array representing the set of leads or balls of a component as "not pristine" may require a predefined threshold of a number of marked leads or balls, e.g., a minimal identification of two contacts, leads or balls from the set of contacts may be required in order to classify the component as "tampered" or "not pristine". For example, if only one lead has evidence, then the component is classified as "pristine" because a predefined threshold of, for example, two marked leads or balls was not reached. An example for consistency check may include identification of the type of the evidence of interfering, e.g., if the types of interface evidence is different between different contacts within a single component, it may be suggested that the component was interfaced by a jig with different interfacing probes, which is not realistic. Other rules, policies or procedures related to logic and consistency may be used.

Embodiments of the invention may further include a classifying stage to cross-check with pre-existing knowledge and with other components in the packaging unit. Some embodiments of the invention may include cross-referencing with pre-existing knowledge which may include comparing the obtained interfaced leads array to known patterns of similar components. This knowledge may be obtained either by using documented information or data on the leads or balls of each component, e.g., what leads, or balls are used to program each component. Such data or information may be available in the components data sheets. Other embodiments of the invention may use other methods to obtain the interfacing pattern, for example, by using an historical database of processed images of components.

Some embodiments of the invention may include cross-referencing within a packaging unit in which the obtained arrays for components that may be included in same packaging unit may be used for comparison. The obtained interfaced leads array may be evaluated by checking logical and consistency rules. For example, a consistency rule may be to check the homogeneity of the arrays within a packaging unit. Such a check may be performed, for example, by an unsupervised network based on k-means methods or similar methods that separates the arrays to groups. The outcome of the abovementioned stages is a classification score for each lead, component, and reel. Based on the score a judgment may be determined using a decision-making algorithm. The decision algorithm may be based on a decision tree, a machine learning algorithm, a threshold or based on any other decision-making method.

Reference is made back to FIG. 2, according to some embodiments of the invention, which shows that the training datasets for training of the machine learning engine or algorithm may include a plurality of images of components similar, analogous, equivalent or identical to component 202. The plurality of images of components may be stored in a database of processor 104 or in a database coupled to processor 104, e.g., in computing platform 220. The plurality of images may be tagged by their characteristics such as, for example, manufacturers, package types, production dates, package dates and the like. The plurality of images may include one or more parameters related to component 202 which may indicate regarding the solderability component 202. For example, the plurality of images may indicate level of degradation of the solderability of component 202 based on manufacturing information. The manufacturing information may be, for example, manufacturing date, manufacturing year, or age, of component 202. The plurality of images may indicate good solderability condition and poor solderability condition for component 202. Herein, the good and poor solderability condition may be indicated using images of new and degraded component 202, respectively, from industries or from artificial environments where the component may be accelerated to degradation. The plurality of images may indicate levels of degradation of solderability of component 202 based on manufacturing information as well as good solderability condition and poor solderability condition for the component 202. A classification based on solderability level of a component may be based on a level of solderability. When a level of solderability is determined to be below a predefined threshold, the component may be classified as having "poor" solderability. When a level of solderability is determined to be above a predefined threshold, the component may be classified as having "good" solderability.

According to some embodiments of the invention, a machine learning algorithm may be trained to derive parameters for the current state of component 202 based on the plurality of images of component 202 and to analyze the derived parameters to assess the solderability of component 202. For example, the derived parameters for the current state of component 202 may be analyzed to determine the usability of component 202. A component, if assessed to have good solderability, may be considered usable, while, if the component is assessed to have poor solderability, then it may be considered unusable.

The derived parameters may be used by system 100 to construct an image of component 202 and to determine an algorithm for the analysis of component 202. Further, the image (or parameters) of component 202 may be processed based on the determined algorithm. In an example, the determined algorithm may enable identification of nature of component 202, nature of contamination layer present on component 202, the usability of component 202, a preventive step for the component 202, or a combination thereof. It is to be noted that such processing of the parameters associated with the component 202 enables assessment of solderability of component 202. The algorithm for deriving and processing the parameters associated with the component may be a deep learning algorithm, wherein such an algorithm may be previously trained using the training datasets. In one example, the machine learning engine may determine the algorithm for the analysis of the parameters of the component from a set of algorithms stored in, for example, a database associated with the system. In certain cases, the machine learning engine may generate an algorithm for the analysis of the parameters of the component.

According to some embodiments of the invention, processor 104 or the machine learning engine employed by processor 104 may further determine manufacturing information associated with component 202. The machine learning engine may classify the derived parameters of component 202 indicating the current state of component 202, based on the training dataset. Further, the machine learning engine may derive manufacturing information corresponding to the component 202 based on the training dataset.

In some embodiments of the invention, system 200 may assess reliability of component 202 or surface of the component 202 upon deriving parameters of component 202. The parameters of component 202 may be derived based on electromagnetic radiation reflected therefrom and/or by processing an image or a representation of component 202. For example, the derived parameters may be used to form an image of the component, wherein the component is assessed based on the formed image. The derived parameters may be used to identify an algorithm associated with the component, wherein the algorithm may be used to assess the component further. For example, the system 200 may identify a formation of a contamination layer on the surface of component 202, using the derived parameters associated with component 202. Processor 104 may analyze the contamination layer to assess the solderability of the component, e.g., by employing a machine learning algorithm for such derivation of parameters associated with the component and analysis of the parameters of the component.

According to some embodiments of the invention, the machine learning algorithm or classification network may classify electronic components based on a feature related to reliability of the electronic components. Classifying a test electronic component to a class indicating a reliability of the test electronic component may be performed by extracting a feature related to reliability of the test electronic component from the image, e.g., a physical feature representing deterioration of electronic component leads in time and classifying the test electronic component to a class indicating a reliability of the test electronic component. The reliability of the electronic components may be determined based on a solderability level of the electronic component leads.

The machine learning algorithm or classification network employed by processor 104 may be designed to capture the fine differences conveyed by one or more physical features that represent the deterioration of the leads in time. The physical feature representing deterioration of electronic component leads in time may be, for example, a texture of a surface of the electronic component leads, e.g., roughness or smoothness of the surface. For example, a frame implemented by a machine learning algorithm may be roughness or waviness that represent the component leads deterioration. The classification network, e.g., a deep convolutional neural network (CNN) network may be constructed and tested based on verified components. The network is designed to classify images to classes representing age based on a plurality of verified electronic components of different production dates.

Embodiments of the invention may use a classifier which may represent a model for a specific manufacturer and specific component type. Within the population of a specific manufacturer and specific component type, the model may be trained to identify classes of age based on tagged and verified electronic components of different production dates. The verification is required in order to assure that the components represent the age that they were tagged with. The age classes may be selected according to the amount of electronic component images having various ages in the database and the possible segmentation to age groups. The detected age may be in resolution of days, weeks, months or years according to the number of the component images from different ages, e.g., various production dates in the database.

According to some embodiments of the invention, a receptive field of the convolutional neural network may be set to include the dominant features that correlates to the physical parameters that represent age. For example, the texture, e.g., the waviness of a surface area of the component. The texture of a surface of the soldering leads may be presented as roughness of the surface. The texture or the roughness may be created by two main mechanisms: a) corrosion layer and intermetallic interactions. The metrology terminology may be used for describing the smoothness of the leads by corrosion as the roughness. As corrosion in metal may change the texture of the surface of the components contacts and may increase the surface roughness, introducing corrosion to the soldering leads may cause the roughness to change, for example, from 0.2 micrometer (um) to 1.6 um. The typical change in the texture of the surface may be difficult for detection due to the resolution of a typical inspection camera installed in a pick-and-place SMT machine, having a typical resolution of approximately 10-17 um. However, a change in reflectance of the light shined on the leads may be seen as a superstructure of the grove creating a waviness that is larger, for example, two orders of magnitude larger, than the original typical change in roughness of the surface of the leads.

Embodiments of the invention may use a machine learning algorithm or classification network by applying a receptive field which may capture the waviness created by the aging of the component. For example, receptive fields may be set to a window of tens-hundreds of microns, e.g., a window of 50 by 50 to 100 by 100 microns. The receptive field may capture the waviness or roughness of the solder leads or balls of the component and may be implemented in a classification network by, for example, implementing a stride and a window size for the CNN.

Embodiments of the invention may include classification by using unsupervised group separation of electronic components based on their age. Such classification process may be used to determine if there is a difference in population of components for the solderability of the components' leads. A population of electronic components may be separated or clustered into groups by using one or more clustering methods, for example, using a k-means approach based on one or more features, parameters or characteristics of the components leads. The features of the leads which may be used are based on the plurality of last layers of the multi-class classification network that contain the abstraction of the most relevant features that are used to distinguish leads by their age. The feature map of the plurality of last layers of the multi-class classification network may be reduced using principal component analysis or a similar tool. The result may present each lead according to its age characteristics in a vector. An unsupervised clustering algorithm may present the vectors of lead characteristics in a space and a clustering process may result in grouping of electronic components with statistically similar age characteristics. In some embodiments, a number of clusters may indicate or represent groups related to age of leads. The unsupervised approach may be used to determine if a component belongs to a group of good or poor solderability based on the group they were clustered to. According to some embodiments of the invention, classifying a test electronic component may include unsupervised group separation to determine if the test electronic component belongs to one of: a group of electronic components having a first solderability level, e.g., "good solderability" or a group of electronic components having a second solderability level, e.g., "poor solderability".

Figure 4:
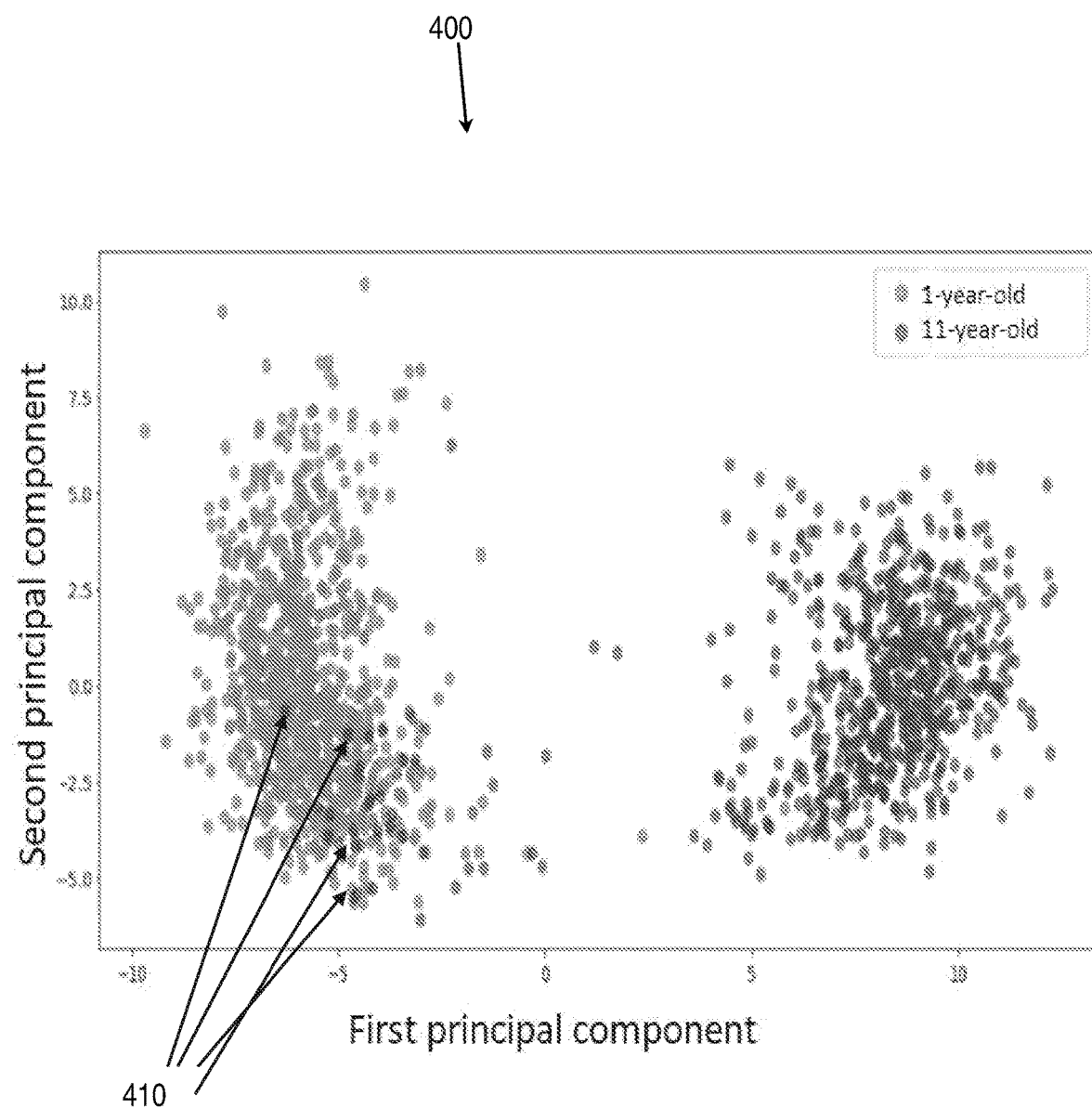
FIG. 4. is a graph depicting clustering based on age, according to some embodiments of the invention.

FIG. 4. is a graph depicting clustering based on age according to some embodiments of the invention. A Principal Component Analysis (PCA) features a graph 400 representing a mixed lot or group of resistor leads of ages 1-year old and 11-years old, where the x coordinate represents a first principal component and the y coordinate represents a second principal component of the PCA representation. The mixed lot was clustered into two groups using machine learning algorithm implementing an unsupervised k-means. A first group of components 410, clustered on the left side of graph 400, is of a 1-year-old components suggesting good-solderability, e.g., marked in light grey color. A second group of components 420, clustered on the right side of graph 400, is of 11-years-old components suggesting poor-solderability e.g., marked in dark grey color. Graph 400 represents a plurality of 11-years-old components 440 clustered to the first group of components 410 which includes the 1-year-old components.

According to some embodiments of the invention, the database, which is used for training the ML algorithm, may be enlarged along time by adding more images of components to refine, enhance and improve the database. To assure that a given reel information may be reliably used to tag a component for its age, e.g., for training of the classification model or the machine learning algorithm, one or more conditions may be used. For example, one or more of the following conditions may be verified: the reel may be purchased from a trusted source through an authorized distribution channel, the chain of custody and storage for the reel may be well documented to assure that the components were stored and processed according to the industry standard, the uniformity of the apparent soldering leads as processed by the machine learning classifier may be beneath a pre-determined threshold, and/or the detected apparent age of the components may be within a tolerance of a previous model results, e.g., the first classification layer.

Figure 5:
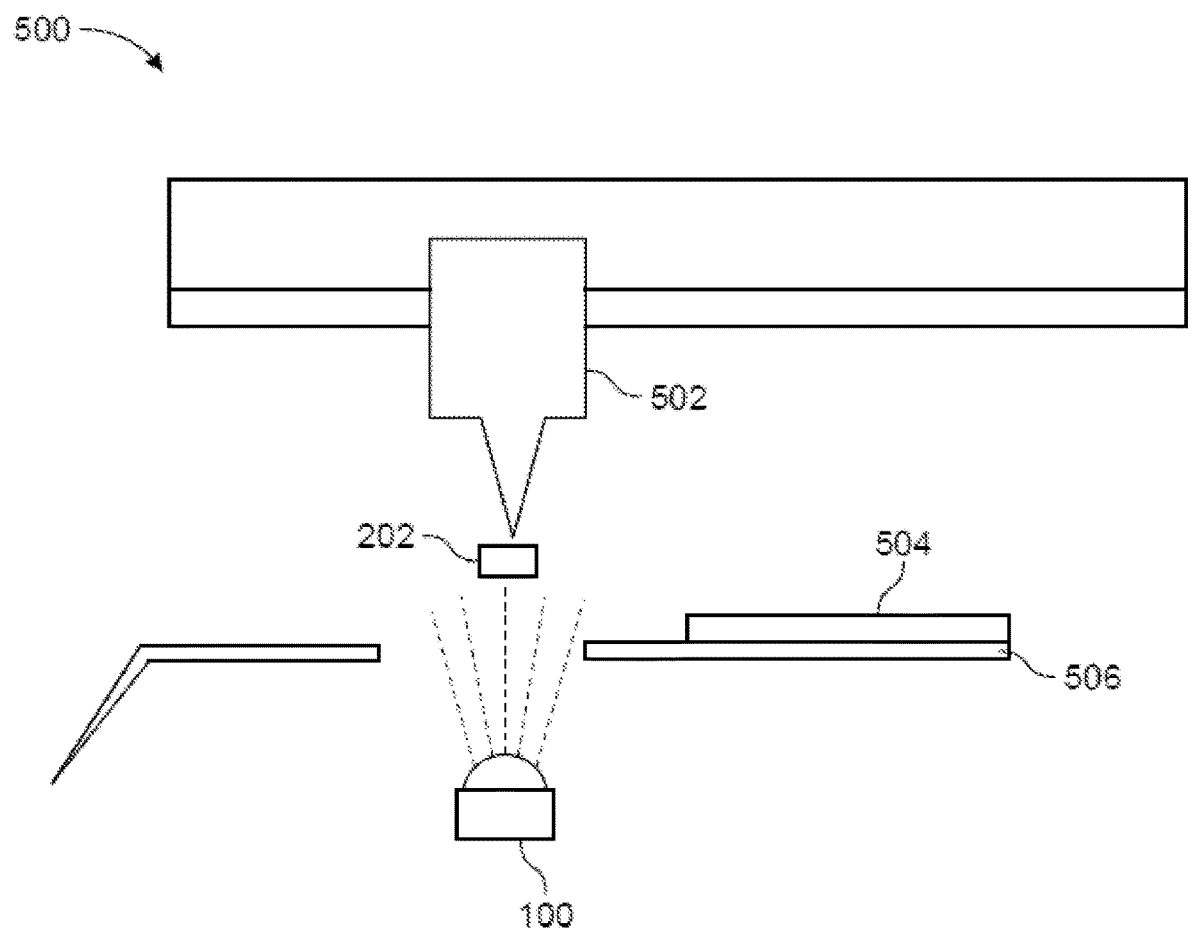
FIG. 5 is a schematic illustration of an exemplary system for reliability assessment of electronic components within a pick-and-place system, according to some embodiments of the invention.

FIG. 5 is a schematic illustration of an exemplary system for reliability assessment of electronic components within a pick-and-place system according to some embodiments of the invention. The methods and the systems for assessing reliability of electronic components which are presented in accordance with some embodiments of the invention, e.g., system 100 of FIG. 1. And or system 200 of FIG. 2 may be used or utilized by, embedded in and/or operated by any other system or machine, for example, reel-to-reel inspection machine, a SMT pick-and-place machine, an X-ray inspection machine or any other system or method that allows high throughput while tracking every individual component features. System 500 may be for example, a SMT pick-and-place machine where a system 100 for automated assessment of tampering and solderability of a component 202 may be implemented. A processor included in or coupled to system 500, for example, embedded system 100, in a reel-to-reel inspection machine or in any other system that may capture images of electronic component, may assess tampering in the component 202 and/or solderability of component 202 during inline assembly process of component 202 in, for example, a Surface-Mount Technology (SMT) pick and place system 500.

According to some embodiments of the invention, SMT pick and place system 500 may include a head element 502 to place component 202 on a printed circuit board (PCB) 504 located on a place station 506. Features, parameters and/or attributes of component 202 may be obtained, derived, or extracted by system 100. For example, a set of attributes of the component 202 may be determined by the processor of system 100 by processing representation of component 202 and/or by processing received electromagnetic radiation reflected from the component 202. The component 202 may be probed while automatically being conveyed and used by SMT pick and place system 500. The component 202 may be assessed according to some embodiments of the invention based on the set of attributes and predefined attributes associated with component 202 and/or based on parameters associated with the component 202.

In some embodiments of the invention, the processor of system 100 may include an artificial intelligence module which may determine a processing algorithm such as a deep learning algorithm for analyzing parameters and assessing the tampering in component 202 and solderability of the lead of component 202. The processing algorithm may be based on machine learning, big data, or a combination thereof. Further, the processing algorithm may constitute the predefined attributes for component 202 for assessment of component 202. For example, the artificial intelligence module may generate the processing algorithm for the assessment of component 202. In some embodiments of the invention, the processor of system 100 may generate the processing algorithm for analysis of the parameters of component 202. Further, the algorithm may be used to assess the solderability of component 202.

Imaging device 100 may provide a representation of component 202 to the processor of system 100. In some embodiments of the invention, imaging systems may include a source and a receiver for transmitting and receiving energy which may enable a processor of imaging system 100 to derive parameters of component 202 to construct an image thereof. For example, the imaging system of system 100 may capture an image of a bottom of component 202, while in some operations imaging system may capture a top or side of the component 202. It is to be noted that implementation of the system 100 in conjunction with the SMT pick and place system should not be construed as limiting in any way. Embodiments of the invention may be implemented in conjunction with other machines, for example, reel-to-reel inspection machines, and other machines entailing such operations associated with system 100. Embodiments of the invention may be used as a quality assurance during production of electronic components, for example to mass-assure the quality and repeatability of the soldering leads production.

In some embodiments of the invention, system 100 may assess tampering in component 202 and/or the solderability of component 202 during a time period between picking and placing component 202. System 100 may move in association with head component 502. Head component 502 may pick component 202 from a location 'A' and place component 202 at a location 'B', where locations 'A' and 'B' may be remote from each other. For example, the location 'A' may be a stack of components, and location 'B' may be PCB 304. The processor assesses the tampering in and/or solderability level of component 202 in a time and energy effective manner. If system 100 assesses that component 202 has not been tampered and/or that a solderability level of leads of component 202 is sufficient, thus making component 202 usable, component 202 may be effectively placed on PCB 504. On assessing that component 202 has been tampered or a poor level of solderability is detected, thus making the component 202 unusable, the processor of system 100 may generate an alert signal regarding component 202, for inspection. In this regard, component 202 may be moved to a location 'C', wherein the location 'C' may be different from location 'A' and 'B'.

Figure 6:
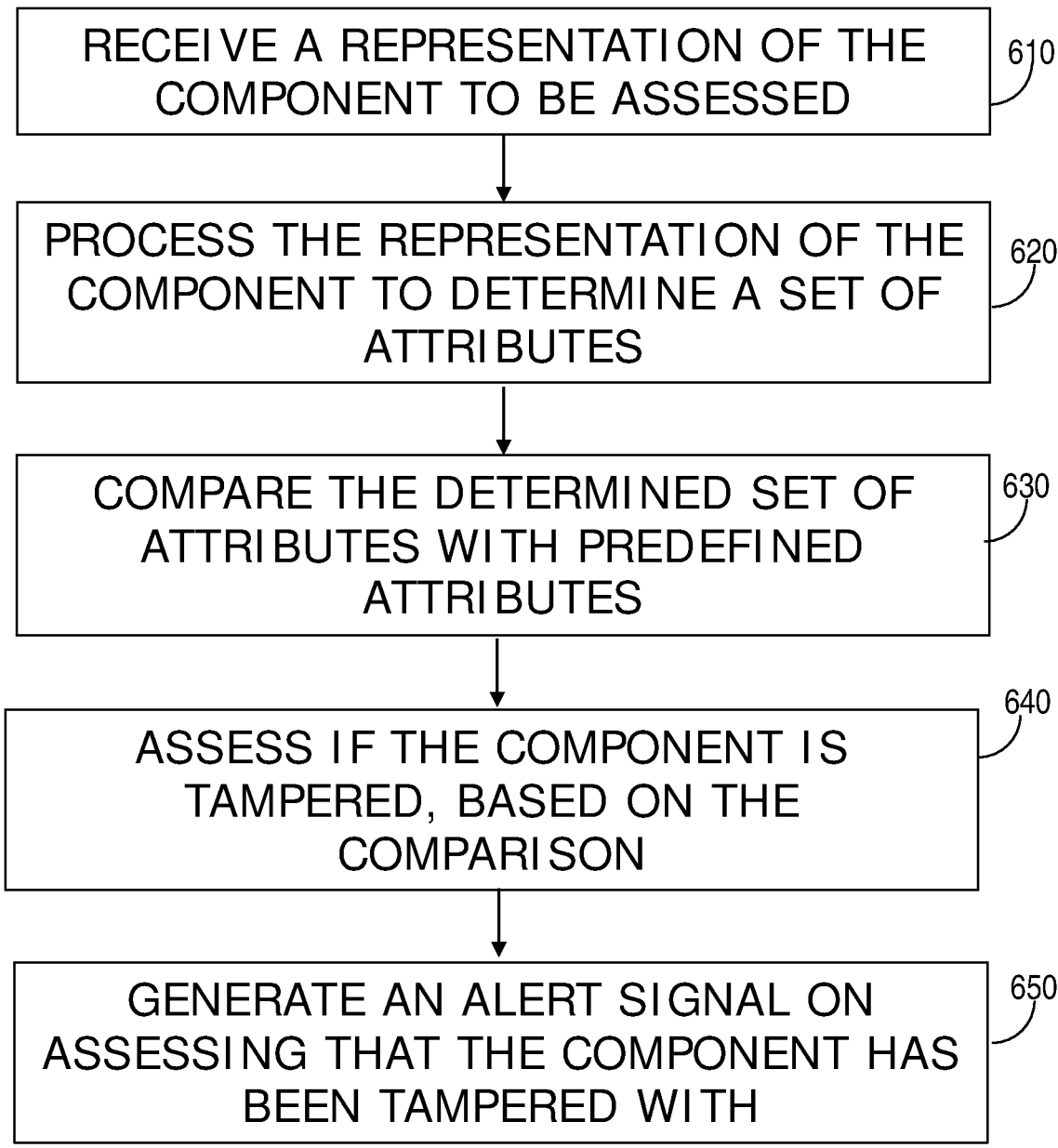
FIG. 6 is a flowchart of a method for automated assessment of tampering in an electronic component, according to some embodiments of the invention.

FIG. 6 is a flowchart of a method for automated assessment of tampering in an electronic component, according to embodiments of the invention. Some of the operations of FIG. 6 may be related or may be similar, analogues and/or may match operations performed, for example, by the system shown in FIG. 1 and FIG. 2. As with other method flowcharts, operations of FIG. 6 may be used with operations in other flowcharts shown herein in some embodiment of the invention.

In operation 610, a representation of the component to be assessed may be received from an imaging system, imaging device or a processing unit coupled to an imaging system. The component may be an electronic component. The imaging system may capture a representation of the component. The representation is not limited and may be from any direction, side, angel, or point of view, e.g., from top or bottom of the component.

In some embodiments of the invention, the system may be implemented within a period between a pick time and a place time in an SMT pick and place system. In such a case, an on-premise camera that is already a part of the SMT pick-and-place system may be used for capturing a representation of the component from bottom and in some machines from top as well.

In operation 620, the representation of the component may be processed to determine a set of attributes and/or features. The attributes may be the images were taken or parts of the images with or without pre-processing. The determined set of attributes correspond to at least one of: manufacturing information and/or physical features of the component. Embodiments of the invention may be implemented using a system, wherein the system comprises an imaging device and a processor. The processor may execute a non-transitory computer-readable medium including instructions. The processor may utilize an artificial intelligence module to perform corresponding operations. The artificial intelligence module that may be tuned to perform the operation driving the processor. The artificial intelligence module may employ a processing algorithm or a machine learning algorithm corresponding to the component such as a CNN network or a classification network for assessing the tampering in the component. The processing algorithm may be based on a machine learning algorithm and/or big data.

The processing algorithm may be trained using a plurality of images of the component and/or associated with the component. The plurality of images may include images of tampered and non-tampered electronic components. The plurality of images may indicate at least one of manufacturing information, tampered and non-tampered condition, soldering conditions. For example, the plurality of images may relate to marks or traces on the component, the marks arise due to tampering with the component. The images of the tampered components may be created by augmentation for the component indicating at least one of manufacturing information, tampered condition and non-tampered condition, solder-leads or balls conditions.

In operation 630, the determined set of attributes and/or features or images may be compared with predefined attributes using either comparison or machine learning algorithms. Comparing the determined set of attributes with predefined attributes by using machine learning detection and classification algorithms that were taught using a multitude of tampered and non-tampered components from the same type of electronic package and/or manufacturer.

In operation 640, an assessment may be made if the component is tampered, based on the comparison and a processing algorithm. The tampering in the component may be performed by interfacing, physical damaging, chemical damaging, marking, coating leads such as connecting leads or balls associated with the component, use of counterfeit components, burning malicious cyber elements or deformation of the component.

According to some embodiments of the invention, the system may assess tampering in the component based on any change in the set of attributes relating to the component. Such change may be identified using a nondestructive visual examination based on a comparison of the set of attributes with the predefined attributes, before the assembly of the component onto, for example, a PCB. A change in the set of attributes relating to the component may be identified based on at least one of manufacturing information, such as manufacturer, model, manufacturing technique, manufacturing machinery, physical features, such as dimensions, condition, solder-leads or balls conditions, marking, or any other features or attribute. For example, the processing algorithm may search for traces of interfacing with the component for re-programming of the component due to malicious cyber elements or electrical interfacing with the component.

In operation 650, an alert signal may be generated on assessing that the component has been tampered with. It should be understood to a person skilled in the art that other operations or sets of operations may be used in accordance with some embodiments of the invention.

Figure 7:
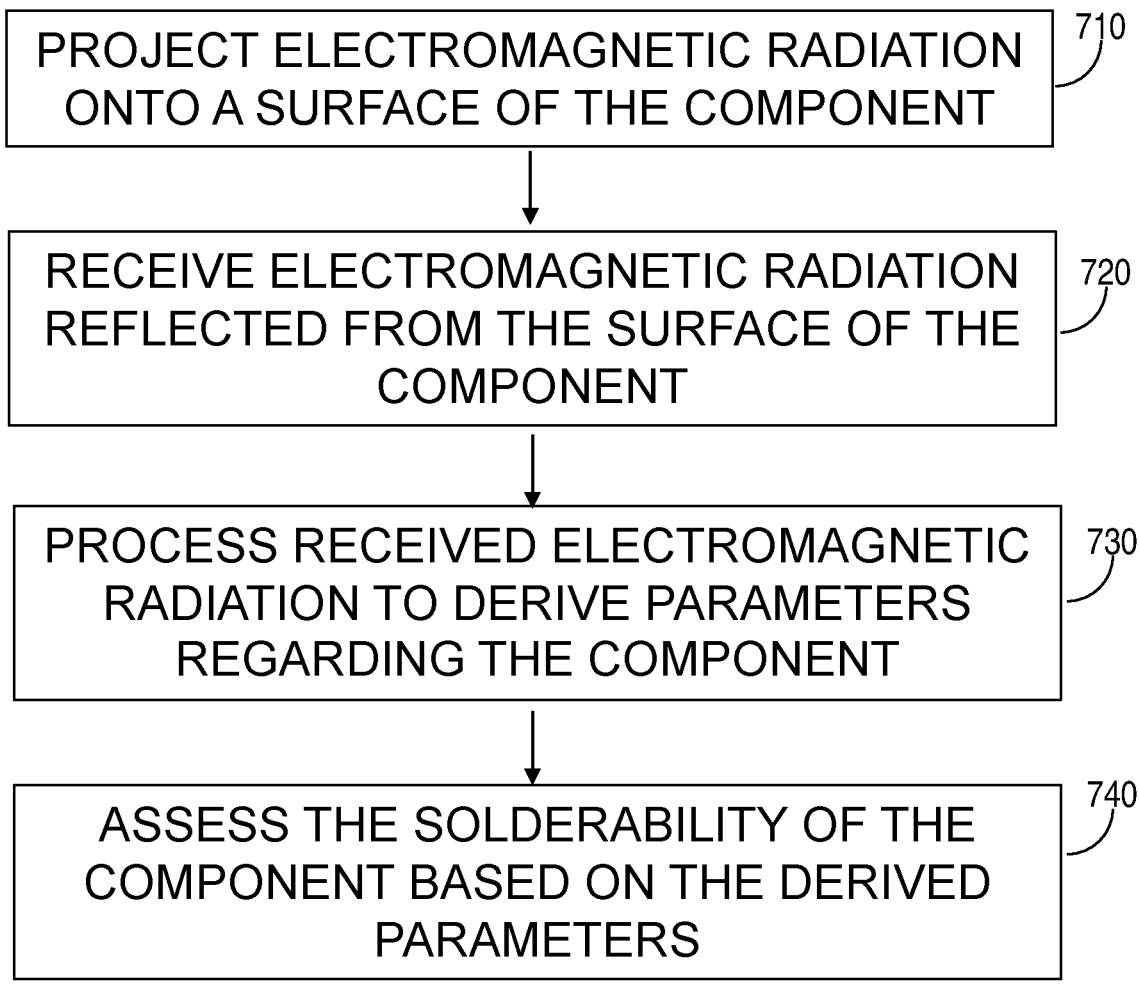
FIG. 7 is a flowchart of a method for automated assessment of solderability of a component, according to embodiments of the invention.

FIG. 7 is a flowchart of a method for automated assessment of solderability of a component, according to some embodiments of the invention. Some of the operations of FIG. 7 may be related or may be similar, analogues and/or may match operations performed, for example, by the system shown in FIG. 1 and FIG. 2. As with other method flowcharts, operations of FIG. 7 may be used with operations in other flowcharts shown herein in some embodiment of the invention. According to some embodiments of the invention, a system for automated assessment of solderability of a component may include a source for generating electromagnetic radiation, a receiver for receiving electromagnetic radiation and a processor coupled to the receiver and the source.

In operation 710, electromagnetic radiation may be projected onto a surface of the component, e.g., by the source. The electromagnetic radiation generated by the source may be at least one of Ultraviolet (UV) radiation, Visible radiation, Infrared radiation (IR). Some embodiments of the invention may be implemented within a time period between a pick time and a place time in an SMT pick and place machine, wherein the system assesses the solderability of the component within the said time period.

In operation 720, electromagnetic radiation reflected from the surface of the component may be received, e.g., by the receiver. The processor may include a machine learning engine, which may process the received electromagnetic radiation to derive parameters regarding the component and assess the solderability thereof.

In operation 730, received electromagnetic radiation may be processed by the processor to derive parameters regarding the component. The processor may utilize a machine learning engine to perform construction of the image of the component based on the received electromagnetic radiation and analysis of the constructed image to determine solderability of the component. The processor may employ one or more machine learning engines or machine learning algorithms that are tuned to derive parameters from received electromagnetic radiation and analyze the parameters of the component to assess the solderability of the component. Embodiments of the invention may be implemented by using deep learning algorithms.

The machine learning engine of the processor is previously trained using a plurality of images associated with the component. For example, the plurality of images associated with the component, used for training the machine learning engine, may indicate levels of degradation of the solderability of the component based on manufacturing information. The plurality of images associated with the component, used for training the machine learning engine, may indicate good solderability condition and poor solderability condition for the component.

In operation 740, a solderability of the component may be assessed based on the derived parameters. In addition to assessing the solderability of the component, the manufacturing information associated with the component may be determined. The machine learning engine may be trained using a plurality of images. The plurality of images may indicate at least one of: levels of degradation of the solderability of the component based on manufacturing information, good solderability condition and poor solderability condition for the component. For example, the machine learning engine may be implemented in conjunction with an artificial intelligence module, wherein such artificial intelligence module may employ an engine other than the machine learning engine for performing operations. The machine learning engine is trained based on multiple images of electronic components stored in one or more databases that are tagged by their manufacturers and package types with their production dates. It should be understood to a person skilled in the art that other operations or sets of operations may be used in accordance with embodiments of the invention.

Figure 8:
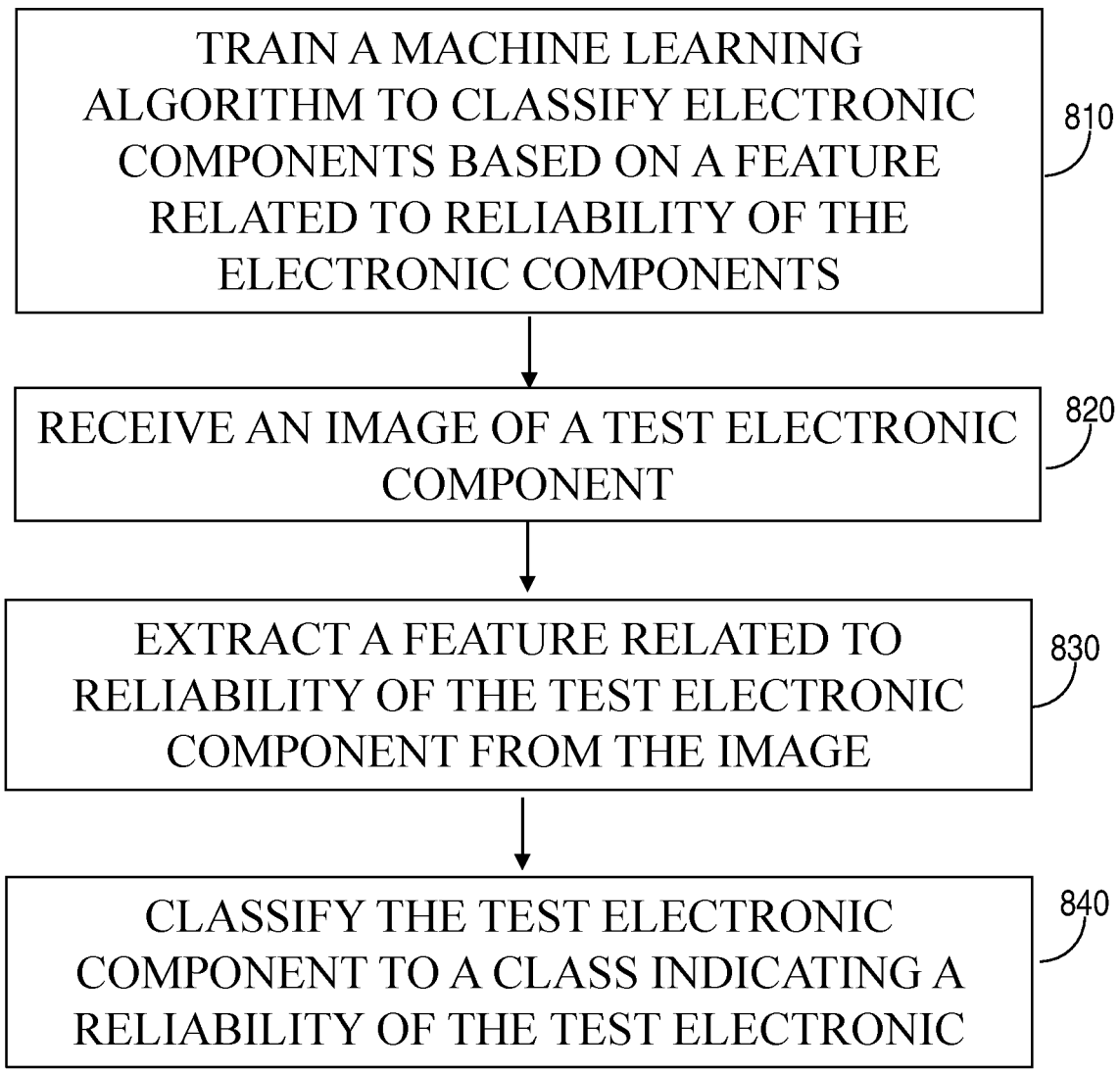
FIG. 8 is a flowchart of a method for automated assessment of reliability of an electronic component, according to some embodiments of the invention.

FIG. 8 is a flowchart of a method for automated assessment of reliability of an electronic component, according to some embodiments of the invention. Some of the operations of FIG. 8 may be related or may be similar, analogues and/or may match operations performed, for example, by the system shown in FIG. 1 and FIG. 2. As with other method flowcharts, operations of FIG. 8 may be used with operations in other flowcharts shown herein in some embodiment of the invention.

In operation 810, a machine learning algorithm may be trained to classify electronic components based on a feature related to reliability of the electronic components.

In operation 820, an image of a test electronic component may be received as an input to the machine learning algorithm/classification.

In operation 830, a feature related to reliability of the test electronic component may be extracted from the image by the machine learning algorithm/classification.

In operation 840, the test electronic component may be classified to a class indicating a reliability of the test electronic component by using the machine learning algorithm.

Figure 9:
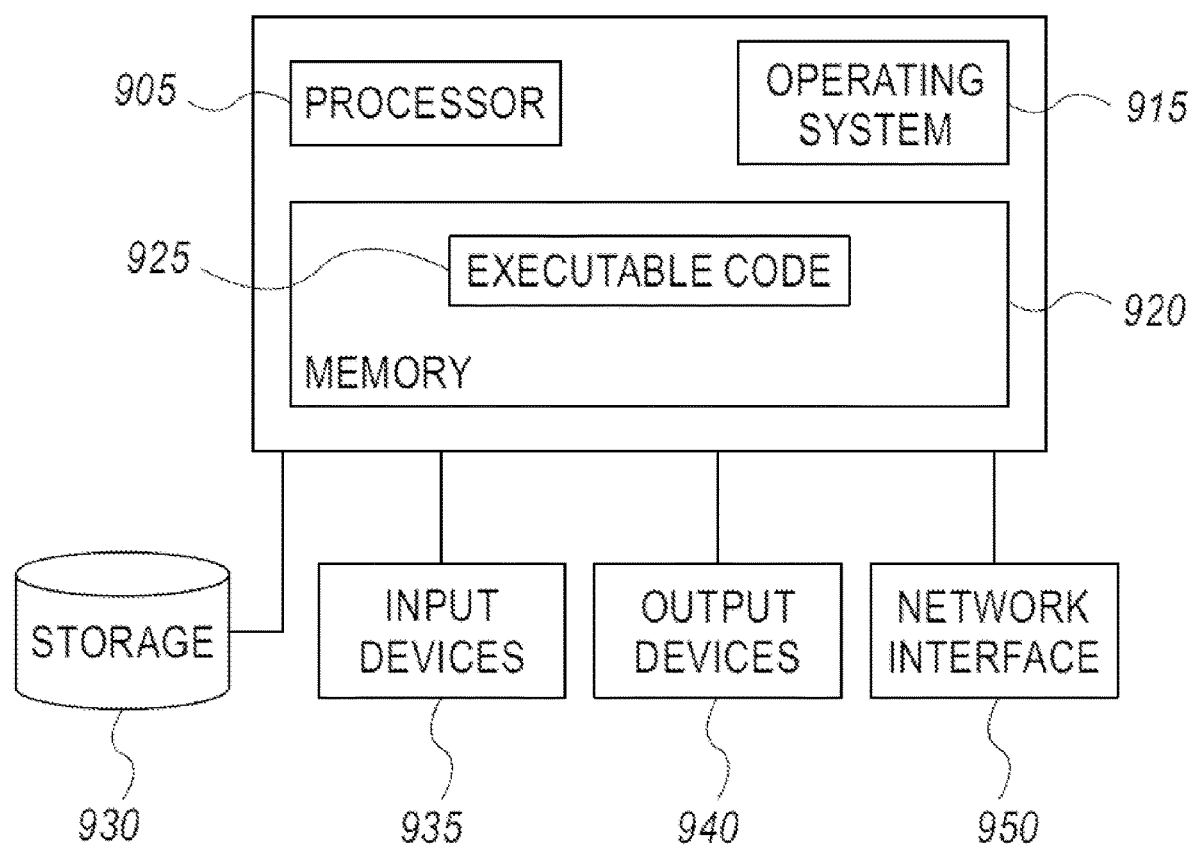
FIG. 9 illustrates an exemplary computing device, according to an embodiment of the invention.

FIG. 9 illustrates an exemplary computing device according to an embodiment of the invention. For example, a computing device 900 with a processor 905 may be used to assess reliability of an electronic component, to employ one or more machine learning algorithms and/or a classification network to classify electronic components based on one or more features, attributes or characteristics related to reliability of the electronic components. For example, computing device 900 may be for example, system 100, system 200 and/or any of processor 104, imaging system 102, and/or database 220.

Computing device 900 may include a processor 915 that may be, for example, a central processing unit processor (CPU), a GPU, a chip or any suitable computing or computational device, an operating system 915, a memory 920, a storage 930, input devices 935 and output devices 940. Processor 905 may be or include one or more processors, etc., co-located or distributed. Computing device 1100 may be for example a smart device, a smartphone, workstation or a personal computer, a laptop, or may be at least partially implemented by one or more remote servers (e.g., in the "cloud").

Operating system 915 may be or may include any code segment designed and/or configured to perform tasks involving coordination, scheduling, arbitration, supervising, controlling or otherwise managing operation of computing device 900, for example. Operating system 915 may be a commercial operating system. Memory 920 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 920 may be or may include a plurality of possibly different memory units.

Executable code 925 may be any executable code, e.g., an application, a program, a process, task or script. Executable code 925 may be executed by processor 905 possibly under control of operating system 915. For example, executable code 925 may be or include code for encoding one or more digital images, according to embodiments of the invention.

Storage 930 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 9 may be omitted. For example, memory 920 may be a non-volatile memory having the storage capacity of storage 930. Accordingly, although shown as a separate component, storage 30 may be embedded or included in memory 920. Storage 930 and or memory 920 may be configured to store any information related to a plurality of items, products and to a plurality of securing devices or any other information required for performing embodiments of the invention.

Input devices 935 may be or may include a camera, a mouse, a keyboard, a touch screen or pad or any suitable input device. It will be recognized that any suitable number of input devices may be operatively connected to computing device 900 as shown by block 935. Output devices 940 may include one or more displays, speakers and/or any other suitable output devices. It will be recognized that any suitable number of output devices may be operatively connected to computing device 900 as shown by block 940. Any applicable input/output (I/O) devices may be connected to computing device 900 as shown by blocks 935 and 940. For example, a wired or wireless network interface card (NIC), a modem, printer or facsimile machine, a universal serial bus (USB) device or external hard drive may be included in input devices 935 and/or output devices 940. Network interface 950 may enable device 900 to communicate with one or more other computers or networks. For example, network interface 950 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Some embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method of determining reliability of an electronic component, the method comprising:
    providing a pick and place system comprising at least one pick and place machine with an imaging system operable to use at least one imaging modality to acquire an image of an electrical contact element of an electronic component used for providing electrical contact to the electronic component during assembly of an electronic circuitry in which the electronic component is to be used;
    setting a receptive field of a convolutional neural network (CNN) so that a spatial resolution of the CNN is sufficient to determine a roughness and/or waviness exhibited by texture of a surface of the electrical contact element imaged in the image;
    processing the image using the CNN to determine within a time period between a pick and place time of the pick and place machine roughness and/or waviness exhibited by texture of the surface of the electrical contact element; and
    using the determined texture roughness and/or waviness to provide within the time period between picking and placing the electronic component in the circuitry an indication of reliability of the electronic component; and
    if the electronic component is indicated to be unreliable, preventing the component from being used in the electronic circuitry.

2. The method according to claim 1 wherein using the determined texture roughness and/or waviness comprises determining solderability of the electronic component based on the texture roughness and/or waviness.

3. The method according to claim 2 wherein determining solderability of the electronic component based on the texture comprises determining a degree of corrosion.

4. The method according to claim 1 and using the determined texture roughness and/or waviness comprises determining age of the electronic component based on the texture.

5. The method according to claim 1 and comprising processing the image to determine tampering of the electronic component.

6. The method according to claim 5 wherein determining tampering of the electronic component comprises identifying a mark on the surface of the electrical contact element evidencing contact with a re-programming probe.

7. The method according to claim 5 wherein determining tampering comprises identifying a deviation in the geometry of the surface of the electrical contact element from a predefined geometry.

8. The method according to claim 7 and comprising determining if the deviation is random.

9. The method according to claim 5 wherein determining tampering comprises using a first classifier to determine if the electrical contact element is pristine and using a second classifier to determine a type of tampering if the first classifier determines that the electrical contact element is not pristine.

10. A system for determining reliability of an electronic component, the system comprising:
    at least one imaging system operable to acquire an image of an electronic component; and
    a computing system configured to receive the at least one image and having:
        a memory storing computer executable instructions executable to process the at least one image in accordance with claim 1; and
        a processor operable to execute the instructions to determine an indication of reliability of the electronic component.

11. The method according to claim 1 wherein the spatial resolution of the CNN is sufficient to detect a change in roughness from 0.2 micrometer (um) to 1.6 um.

12. The method according to claim 1 wherein the receptive field of the CNN is characterized by a window between 50×50 microns to 100 by 100 microns.

* * * * *